United States Patent

[11] 3,610,842

[72] Inventors Ferdinando Formenti; Aldo Perna, both of Milan, Italy

[21] Appl. No. 885,478

[22] Filed Dec. 16, 1969

[45] Patented Oct. 5, 1971

[73] Assignee Societa Italiana Telecommunicazioni Siemens S.p.A. Milan, Italy

[32] Priority Dec. 17, 1968

[33] Italy

[31] 25167 A/68

[54] CHECKING SYSTEM FOR BINARY DECODER

7 Claims, 1 Drawing Fig.

[52] U.S. Cl. .......... 179/175.2 R, 340/146.1

[51] Int. Cl. .......... H04m 3/24

[50] Field of Search .......... 340/146.1; 324/73; 179/175.2 R

[56] References Cited

UNITED STATES PATENTS

| | | | |
|---|---|---|---|
| 3,348,198 | 10/1967 | Winter .......... | 340/146.1 |
| 3,333,188 | 7/1967 | Eagle .......... | 324/73 |
| 2,484,226 | 10/1949 | Holden .......... | 340/146.1 |

*Primary Examiner*—Kathleen H. Claffy

*Assistant Examiner*—Douglas W. Olms

*Attorney*—Karl F. Ross

ABSTRACT: A decoder used to emit a succession of commands in the testing of telephone lines, with several output leads only one of which carries a voltage of unit magnitude in any operating condition of the decoder, is checked for correct performance by a network in which a first conductor $Y_1$ is connected to all the output leads $H_a$...$H_n$ of the decoder through respective diodes $D_{1a}$...$D_{1n}$ while a second conductor $Y_2$ is connected to these same leads through other diodes $D_a$...$D_n$ in series with respective resistors $R_a$...$R_n$. A first comparator $CO_1$ measures the voltage $V_{y1}$ of the first conductor against a reference voltage $V_0$ while a second comparator $CO_2$ measures the voltage $V_{y2}$ of the second conductor against voltage $V_{y1}$; only comparator $CO_1$ has a true output if the decoder functions correctly with a single output lead energized, whereas in all other instances both decoders have outputs of either zero or unity.

PATENTED OCT 5 1971 3,610,842
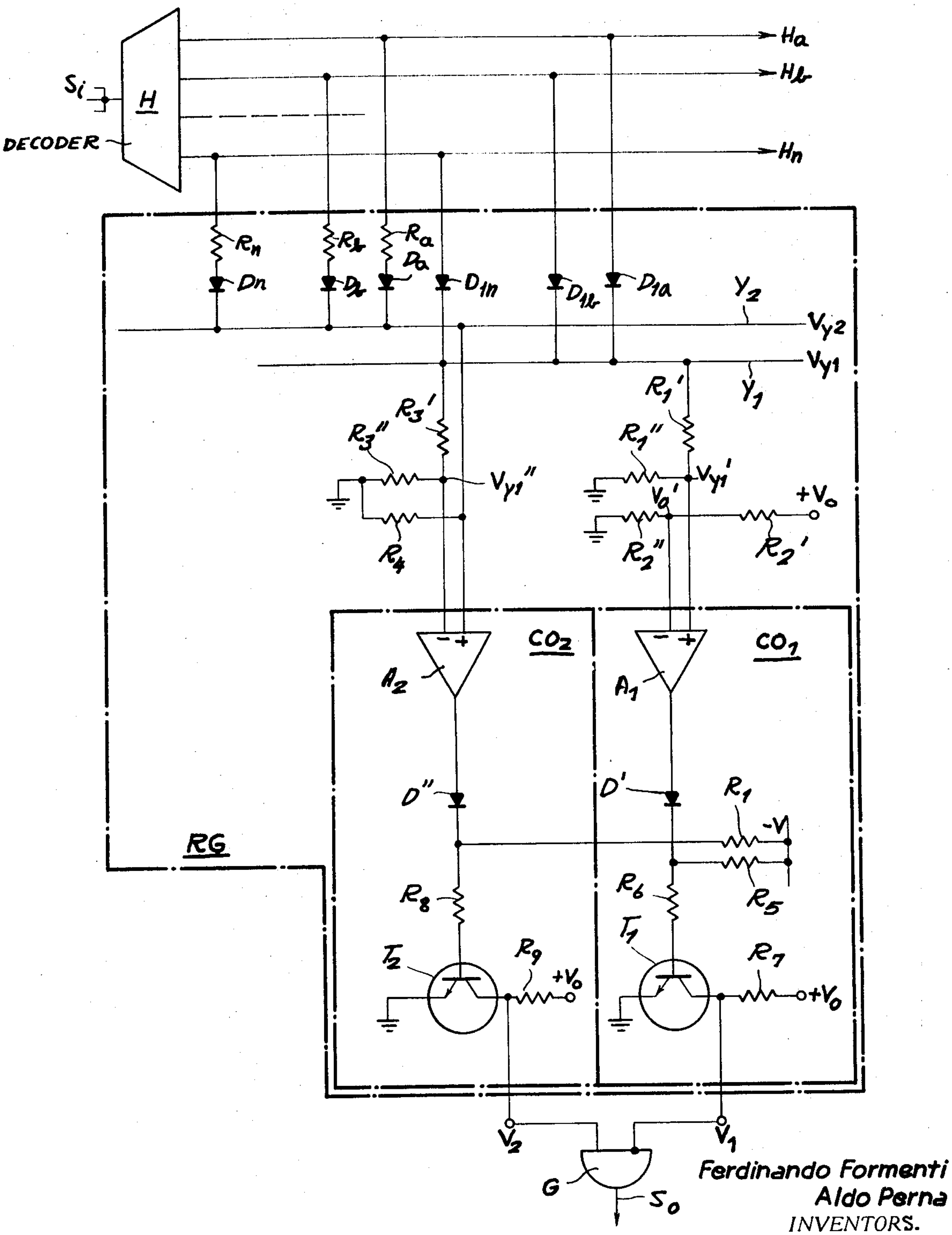
Ferdinando Formenti
Aldo Perna
INVENTORS.
BY
Karl F. Ross
Attorney

CHECKING SYSTEM FOR BINARY DECODER

Our present invention relates to a system for checking the correct performance of a binary unit with a plurality of output leads individually energized with a predetermined signal voltage, representing the logical value or bit "1", during respective operating stages.

In commonly owned application Ser. No. 884,920 filed Dec. 15, 1969 by A. Perna and G. De Varda (Attorney's Docket No. 6413), there has been disclosed a binary unit of this type in the form of a decoder generating a succession of command signals to carry out consecutive test stages on a subscriber line of a telephone or other telecommunication system under the control of a circulating memory which, in one of its time slots, registers successive numerical values corresponding to the types of test to be performed. These tests may be used, for example, to ascertain the integrity of signaling circuit and/or talking circuits, the absence of cross talk between neighboring communication channels established by successive time slots or phases in an operating cycle in a time-sharing communication network, as well as the absence of short circuits.

The correct functioning of such a decoder and related circuitry requires the energization of a single output lead, varying from one stage to the next, throughout its operation; in a more elaborate arrangement, such decoder may consist of several sections each with a plurality of individually energizable outputs. In either case, the generation of a false alarm or a failure to register a malfunction could result from a faulty operation involving the energization of more than one output lead, or none at all, of the decoder or any of its sections.

It is, therefore, the object of our present invention to provide simple and effective means for verifying the correct operation of a binary unit of this character.

This object is realized, pursuant to our present invention, by the provision of a logical summing network with a first output conductor and with a plurality of inputs respectively connected to the output leads of the unit to be checked, a resistance matrix with a second output conductor and with respective input connections to the output leads of that unit, and a source of a first and a second reference potential against which the voltages of these output conductors are measured by respective comparators. Thus, the voltage on the first output conductor is of a substantially invariable finite magnitude whenever one or more of the output leads of the binary unit are energized; a comparison of that voltage with the first reference potential, therefore, reveals whether any output lead carries current, giving rise to a first verification signal if this is the case. The voltage on the second output conductor, however, varies with the number of energized output leads so that a comparison thereof with the second reference potential reveals whether its energization is due to conduction of a single output or several outputs of the binary unit, giving rise to a second verification signal if not more than one output lead carries current.

The comparison may, of course, be carried out between the corresponding reference potential and a test voltage proportional to the conductor voltage in any ratio including the ratio 1:1.

Advantageously, the second reference potential is derived from the voltage of the first output conductor through a step-down circuit such as a voltage divider.

The above and other features of our invention will be more fully described hereinafter with reference to the accompanying drawing the sole FIG. of which diagrammatically illustrates a representative embodiment.

In the drawing we have shown a binary decoder H successively receiving in its input a variety of code combinations $S_1$ from a signal source not shown, such as a circulating memory counting progressive numerical values in a periodically recurring phase or time slot. A number of output leads $H_a$, $H_b$,...$H_n$ are individually energizable with a predetermined voltage (here positive) in response to these code combinations. The leads $H_a$–$H_n$ may serve, for example, to test the integrity of line circuits as described above and as more fully disclosed in the copending application Ser. No. 884,920 by A. Perna et al.

A logical summing network is constituted by a set of diodes $D_{1a}$, $D_{1b}$, ...$D_{1n}$ connected between respective leads $H_a$, $H_b$,...$H_n$ and a common output conductor $Y_1$. Thus, conductor $Y_1$ is maintained at a substantially invariable potential $V_{y1}$ whenever one or more output leads $H_a$ etc. are energized, it being assumed that the forward resistance of the diodes $D_a$ etc. as well as the internal resistance of the voltage source in decoder H are small so that the number of the energized leads has only a negligible effect upon this voltage.

A resistance matrix comprising another set of diodes $D_a$, $D_b$,...$D_n$ is similarly inserted between the output leads of the decoder and a second conductor $Y_2$, this matrix differing from the summing network $D_{1a}$–$D_{1n}$ by the presence of resistors $R_a$, $R_b$,...$R_n$ of identical magnitude in series with the respective diodes $D_a$, $D_b$,...$D_n$. With conductor $Y_2$ connected to the negative source terminal (ground) through a resistor $R_4$, the output voltage $V_{y2}$ on that conductor is a function of the conductance of the resistive circuit in series with resistor $R_4$, i.e. of the number of resistors $R_a$ etc. connected in parallel between the source and conductor $Y_2$.

A source of fixed reference potential $+V_0$ is shown connected across a voltage divider $R_2'$, $R_2''$, the junction of its two resistors being tied to an input of a differential amplifier $A_1$ forming part of a first comparison circuit $CO_1$. The other input of this amplifier receives a fraction of voltage $V_{y1}$ derived from another voltage divider $R_1'$, $R_1''$. The relative magnitude of reference voltage $V_0$ and the unit voltage appearing on any of leads $H_a$–$H_n$ is such that, with one or more of these leads energized, the test voltage $V_{y1}'$ derived from voltage $V_{y1}$ and fed to the additive input of differential amplifier $A_1$ exceeds the reference potential $V_o'$ fed to the subtractive terminal of that amplifier. A positive output voltage from amplifier $A_1$ is applied through a diode D' to the junction of two further resistors $R_5$, $R_6$ connected between a source of negative voltage $-V$ and the base of an NPN transistor $T_1$ whose emitter is grounded and whose collector is returned to positive voltage $+V_o$ through a resistor $R_7$. Transistor $T_1$ thus acts as an inverter, being cut off in the absence of an output from amplifier $A_1$ to generate a high collector voltage $V_1$ which disappears as soon as the transistor is carried to saturation by a positive voltage traversing the diode D'.

Conductor $Y_1$ is also connected to ground through a further voltage divider $R_3'$, $R_3''$ to establish at the junction of its two resistors a substantially fixed reference potential $V_{y1}''$ whenever conductor $Y_1$ is energized. Potential $V_{y1}''$ is fed to the subtractive input of another differential amplifier $A_2$, forming part of a second comparison circuit $CO_2$, whose additive input receives the voltage $V_{y2}$ of conductor $Y_2$. The magnitudes of resistors $R_3'$, $R_3''$ are so chosen, in conjunction with those of resistors $R_a$ etc. and $R_4$, that voltage $V_{y2}$ is less than voltage $V_{y1}''$ whenever only one of leads $H_a$ etc. is energized (both these voltages being zero when the decoder H has no output) but that voltage $V_{y2}$ exceeds the reference voltage $V_{y1}''$ when more than one output lead of the decoder carries voltage. In the latter instance, therefore, amplifier $A_2$ conducts and, through a diode D'' and a voltage divider $R_1$, $R_8$, energizes the base of another NPN transistor $T_2$ whose emitter is grounded and whose collector is connected to potential $+V_0$ through a resistor $R_9$ . As the circuits of the two transistors are analogous, transistor $T_2$ is cut off when amplifier $A_2$ does not conduct, thus giving rise to a high-collector voltage $V_2$; if a current from amplifier $A_2$ traverses the diode D'', transistor $T_2$ is saturated and voltage $V_2$ becomes zero.

Thus, a verification network RG including the circuits described above has a zero output potential $V_1$ and a finite output potential $V_2$ when the decoder H functions properly, i.e. when voltage $V_{Y1}'$ exceeds voltage $V_0'$ whereas voltage $V_{y2}$ is less than voltage $V_{y1}''$. Under these circumstances, therefore, an AND gate G with an inverting input connected to the collector of transistor $T_1$ and a noninverting input connected to the collector of transistor $T_2$ produces an output signal $S_0$ which may serve as an enabling pulse for the performance of the tests commended by the decoder H; an alarm device, not shown, could also respond to the absence of that signal.

The following truth table shows the logical values of the output potentials $V_1$ and $V_2$ under different test conditions:

| Number of Energized Decoder Outputs | $V_1$ | $V_2$ |
|---|---|---|
| None | 1 | 1 |
| One | 0 | 1 |
| Two or more | 0 | 0 |

We claim:

1. A system for checking the correct performance of a binary unit with a plurality of output leads individually energizable with a predetermined signal voltage during respectively operating stages, comprising:

a logical summing network with a plurality of inputs respectively connected to said output leads and with a first output conductor;

a resistance matrix with respective input connections to said output leads and with a second output conductor;

a source of first reference potential less than a substantially constant voltage present on said first output conductor upon energization of at least one of said output leads;

a source of second reference potential greater than a relatively low voltage present on said second output conductor upon energization of at least one of said output leads but less than a relatively high voltage present on said second output conductor upon energization of 2 plurality of said output leads;

first comparison means connected to said first output conductor and to said source of first reference potential for emitting a first verification signal upon a first test voltage, proportional to the voltage on said first output conductor, exceeding said first reference potential;

and second comparison means connected to said second output conductor and to said source of second reference potential for emitting a second verification signal upon a second test voltage, proportional to the voltage on said second output conductor, being less than said second reference potential.

2. A system as defined in claim 1 wherein said source of second reference potential includes said first output conductor.

3. A system as defined in claim 2 wherein said source of second reference potential further a voltage divider connected to sald first output conductor for energization thereby.

4. A system as defined in claim 1 wherein said summing network comprises a set of diodes inserted between said inputs and said first output conductor.

5. A system as defined in claim 4 wherein said resistance matrix comprises a set of resistors of like magnitudes and a set of other diodes serially inserted between said input connections and said second output conductor.

6. A system as defined in 1 wherein said first and second comparison means comprise r respective differential amplifiers with inverting output stages.

7. A system as defined in claim 1, further comprising indicator means connected to the outputs of said first and second comparison means for revealing the concurrent presence of said first and second verification signals.